Patented Aug. 31, 1948

2,448,208

UNITED STATES PATENT OFFICE 2,448,208

PROCESS OF STABILIZING ORGANIC MATERIALS AND PRODUCT OF SAID PROCESS

Harry M. Barnes, Florham Park, N. J., assignor to General Foods Corporation, Hoboken, N. J., a corporation of Delaware No Drawing. Original application October 17, 1944, Serial No. 559,135. Divided and this application November 21, 1947, Serial No. 787,482

11 Claims. (Cl. 99—150)

The present invention relates to the stabilization of organic materials subject to oxidative deterioration. This application is a division of my application Serial No. 559,135 filed October 17, 1944.

An object of the invention is to provide a process for stabilizing organic materials such as certain essential oils, animal and vegetable oils and fats, cereals and other foodstuffs containing such oils or fats, against oxidative deterioration.

Another object of the invention is to provide novel compositions of organic materials subject to oxidative deterioration and a compound which is effective to stabilize the organic materials against said deterioration.

These and other objects will be more readily understood from the following specific description.

It is well known that certain essential oils, vegetable and animal oils and fats, cereals and other foodstuffs containing these oils and fats undergo certain chemical changes when exposed to air or other oxidative influences, resulting in changes of color, odor, or other properties which render them objectionable or unusable.

According to this invention, I have found that these organic materials subject to oxidative deterioration can be stabilized by the addition of very small amounts of 5-pentadecyl resorcinol,

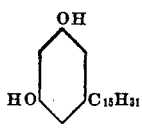

This compound is a tasteless, white crystalline solid melting at 92° C. It is insoluble in water but readily soluble in oils, fats, hydrocarbons and organic solvents in general.

5-pentadecyl resorcinol was fed to rats at levels of 0.5% and 1.0% of their total diet by premixing it with a standard diet. At the end of two weeks, the animals receiving 5-pentadecyl resorcinol had gained somewhat less in body weight than the control animals who had not been receiving 5-pentadecyl resorcinol. However, the loss in body weight was parallel to the reduction in the total food intake. At the conclusion of the test, the animals were chloroformed, and autopsy revealed the absence of any abnormal organic condition.

5-pentadecyl resorcinol is entirely suitable for use in accordance with the invention. It does not impart any taste, color or odor to the organic materials to which it is added and is furthermore suitable for addition to foodstuffs. In protecting the materials of the type described, against oxidation, it is advantageous to make use of an anti-oxidant that is readily and substantially oil-soluble. This is especially true of foodstuffs containing oils in dispersion inasmuch as an anti-oxidant dissolved in the oil will be at the locus of oxidation. 5-pentadecyl resorcinol fulfills the condition of oil-solubility and is furthermore insoluble in water, so that it remains in the oil at all times.

The 5-pentadecyl resorcinol as such, or in admixture with other substances may be applied to the material to be protected in any suitable manner. If it is desired to protect an oil or fat, the anti-oxidant may simply be stirred in and allowed to dissolve. The 5-pentadecyl resorcinol may be dusted upon the surface of materials such as meat products or incorporated by mechanical mixing into substantially dry and granular oil or fat-containing materials such as cereals, or it may be dissolved in an oil or fat carrier and the admixture stirred in or sprayed upon the material to be protected.

The concentrations of 5-pentadecyl resorcinol necessary will depend upon the material to which it is added and the length of time during which anti-oxidative protection is desired. In general, I have found that satisfactory results are obtained using concentrations ranging from 0.01% to 0.50%.

By the term "animal and vegetable oils and fats," I mean those oils and fats which are of animal or vegetable origin and are glycerides of the more or less unsaturated higher fatty acids mixed with some saturated glycerides. Some of these materials are fish oils, lard, beef tallow, olive oil, coconut oil, and peanut oil. By essential oils I mean those volatile oils of characteristic odor derived from plants, leaves, flowers, fruits, etc. such as oil of bitter almonds and lemon oil.

Further embodiments of my invention will appear from the more detailed description set forth below, it being understood however, that this more detailed description is given by way of illustration and explanation only, and not by way of limitation, since various changes therein may be made by those skilled in the art without departing from the scope and spirit of the present invention.

EXAMPLE I

Samples of a food product composed of wheat farina, wheat germ and corn flour were pulverized in a mortar, thoroughly mixed with 0.20% of 5-pentadecyl resorcinol and then placed in closed bottles and stored at 113° F. A sample containing no 5-pentadecyl resorcinol was similarly prepared. The samples were tested periodically for the onset for rancidity. Results of the tests follow.

TABLE I

| Per cent of 5-pentadecyl resorcinol relative to food product | Time required for rancidity to develop |
|---|---|
| Per cent | Days |
| 0.00 | 17 |
| 0.20 | 75 |

EXAMPLE II 5-pentadecyl resorcinol was dissolved in coconut oil and 1.5% of the resulting product was thoroughly incorporated into a dough composed of wheat farina, wheat germ and corn flour. The dough was cooked, chipped, flaked and toasted and stored in closed bottles at 113° F. A control sample containing no 5-pentadecyl resorcinol was similarly prepared. Periodic tests were made to determine the onset of rancidity. The following table indicates the results obtained.

TABLE II

| Per cent of 5-pentadecyl resorcinol relative to food product | Time required for rancidity to develop |
|---|---|
| Per cent | Days |
| 0.00 | 28 |
| 0.05 | 55 |

EXAMPLE III

Samples of pulverized corn grits were prepared containing 0.20% and 0.02% 5-pentadecyl resorcinol. With each sample was mixed a material known to facilitate rancidity development in the corn grits. The resulting mixtures were placed in screw-cap glass jars and incubated at 113° F. A control sample containing no anti-oxidant was similarly prepared and treated. The results appear in the following table.

TABLE III

| Per cent of 5-pentadecyl resorcinol relative to corn grits | Time required for rancidity to develop |
|---|---|
| Per cent | Days |
| 0.00 | Less than 1 |
| 0.02 | 5 |
| 0.20 | 48 |

EXAMPLE IV

Samples of processed corn flour were similarly treated and tested as in Example III. The results follow:

TABLE IV

| Per cent of 5-pentadecyl resorcinol relative to corn flour | Time required for rancidity to develop |
|---|---|
| Per cent | Days |
| 0.00 | 1 |
| 0.02 | 3 |
| 0.20 | 70 |

The results shown in Examples I, II, III and IV clearly indicate the efficacy of 5-pentadecyl resorcinol as an anti-oxidant when added in small quantities to oil-containing vegetable products.

EXAMPLE V

Batches of a 25% aqueous solution of gelatin were homogenized with approximately 10% of oil of bitter almonds, to which varying amounts of 5-pentadecyl resorcinol were added. The resulting mixture was poured into trays in a layer about one-quarter inch thick, and dried rapidly to minimize oxidation. The dried product was cut into slabs, pulverized to 40–80 mesh, placed in wide-mouthed open bottles and stored at 100° F. for three weeks. A control sample without 5-pentadecyl resorcinol was similarly prepared. The amounts of oil of bitter almonds remaining after the drying and grinding process and after the three weeks storage period were determined. The following table records the results.

TABLE V

| Per cent of 5-pentadecyl resorcinol relative to oil of bitter almonds | Per cent of oil of bitter almonds remaining | |
|---|---|---|
| | After drying and grinding | After three weeks at 100° F. |
| Per cent | Per cent | Per cent |
| 0.00 | 95 | 55 |
| 0.00 | 90 | 52 |
| 0.50 | 98 | 67 |
| 1.00 | 96 | 69 |

EXAMPLE VI

Lemond oil was mixed with gelatin and treated substantially as in Example V. The following table records the percentage of lemon oil remaining after the drying and grinding process and after three weeks storage at 100° F.

TABLE VI

| Per cent of 5-pentadecyl resorcinol relative to lemon oil | Per cent of lemon oil remaining | |
|---|---|---|
| | After drying and grinding | After three weeks at 100° F. |
| Per cent | Per cent | Per cent |
| 0.00 | 76 | 61 |
| 0.01 | 84 | 76 |
| 0.10 | 90 | 86 |
| 1.00 | 83 | 79 |

It is evident from the results recorded in Tables V and VI that the losses sustained by oxidative deterioration of flavoring materials during processing and storage may be markedly decreased by the use of small quantities of 5-pentadecyl resorcinol.

EXAMPLE VII

A sample of lard was stabilized by dissolving therein 0.20% 5-pentadecyl resorcinol by weight. The effectiveness of the 5-pentadecyl resorcinol as an oxidation inhibitor was measured in an accelerated oxidation test at 90° C. in a Barcroft-Warburg oxygen absorption apparatus. As a control an untreated portion of the same lard was similarly tested. The "induction period" reported in the table is the elapsed time from the start of the oxidation test until evidence of rancidity was observed.

TABLE VII

*Induction periods and protection factors at 90° C. for 5-pentadecyl resorcinol in lard*

| Anti-oxidant | Concentration Anti-oxidant | Induction Period | Protection Factor [1] |
|---|---|---|---|
| | Per cent | Hours | |
| 5-pentadecyl resorcinol | 0.20 | 6.3 | |
| Do | 0.20 | 6.6 | |
| | | Av. 6.5 | 2.50 |
| Control | none | 2.6 | |

[1] Protection Factor = $\frac{\text{Induction period of treated fat}}{\text{Induction period of control}}$

EXAMPLE VIII

Wheat farina, flaked wheat germ, tricalcium phosphate, sugar, salt, dried yeast, reduced iron, malt syrup, and water were thoroughly mixed into a dough and a solution of 5-pentadecyl resorcinol in coconut oil was added. The added 5-pentadecyl resorcinol constituted 0.05% of the mass. The resulting dough was cooked in an autoclave and thereafter was shredded and dried. The dried product was ground fine and part of the powder was held in vacuo at room temperature for 16 hours while the remainder was toasted 10 minutes at 150° C. in an electric oven. Samples of the evacuated material and of the toasted material (adjusted to 3.5% moisture) were incubated at 45° C. and observed over a period of time for evidence of rancidity. A control sample prepared with the same amount of added coconut oil but no 5-pentadecyl resorcinol was treated in the same way and observed for rancidity.

The results of the observations are set out in the following table.

TABLE VIII

*Anti-oxidant cooked into dough*

| Anti-oxidant | Days to go Rancid at 45° C. | |
|---|---|---|
| | Untoasted, 16 hrs. in Vacuo at Room Temperature | Toasted and Adjusted to 3.5% Moisture |
| 0.05% 5-pentadecyl resorcinol | 47 | 54 |
| Control | 27 | 27 |

It will be apparent from the foregoing that the invention is capable of many other variations, particularly with respect to the organic materials which are stabilized and the manner of incorporating the 5-pentadecyl resorcinol in the materials, without departing from the essential features of the invention.

I claim:

1. A process for stabilizing a material containing an essential oil against oxidative deterioration, which comprises adding thereto a small effective amount of 5-pentadecyl resorcinol.

2. A process for stabilizing a material containing an essential oil against oxidative deterioration, which comprises adding thereto 5-pentadecyl resorcinol in a quantity of about 0.01% and about 0.50% by weight of said material.

3. A process for stabilizing a gelatin foodstuff containing an essential oil subject to oxidative deterioration, which comprises incorporating in said foodstuff a small effective amount of 5-pentadecyl resorcinol as a stabilizer.

4. The process of claim 3 wherein the 5-pentadecyl resorcinol is incorporated in a quantity between about 0.01% and about 0.50% by weight of said gelatin foodstuff.

5. A process for stabilizing an essential oil against oxidative deterioration, which comprises incorporating therein a small effective amount of 5-pentadecyl resorcinol.

6. A composition stabilized against oxidative deterioration comprising a material containing an essential oil subject to oxidative deterioration and a small amount of 5-pentadecyl resorcinol present in said material as a stabilizer.

7. A composition stabilized against oxidative deterioration comprising a material containing an essential oil subject to oxidative deterioration and from about 0.01% to about 0.50% by weight of 5-pentadecyl resorcinol present in said material as a stabilizer.

8. A composition stabilized against oxidative deterioration comprising a gelatin foodstuff containing an essential oil subject to oxidative deterioration and a small amount of 5-pentadecyl resorcinol present in said foodstuff as a stabilizer.

9. A composition stabilized against oxidative deterioration comprising a gelatin foodstuff containing an essential oil subject to oxidative deterioration and from about 0.01% to about 0.50% by weight of 5-pentadecyl resorcinol present in said foodstuff as a stabilizer.

10. A composition stabilized against oxidative deterioration comprising an essential oil subject to oxidative deterioration and a small quantity of 5-pentadecyl resorcinol present therein as a stabilizer.

11. A composition stabilized against oxidative deterioration comprising an essential oil subject to oxidative deterioration and from about 0.01% to about 0.50% by weight of 5-pentadecyl resorcinol present therein as a stabilizer.

HARRY M. BARNES.